US008786115B2

(12) United States Patent
Tort-Ortiz et al.

(10) Patent No.: US 8,786,115 B2
(45) Date of Patent: Jul. 22, 2014

(54) SYSTEMS FOR GENERATING ELECTRICAL ENERGY

(76) Inventors: Guifre Tort-Ortiz, San Juan, PR (US); Antonio Jose Roig-Pagan, Ponce, PR (US)

(*) Notice: Subject to any disclaimer, the term of this patent is extended or adjusted under 35 U.S.C. 154(b) by 15 days.

(21) Appl. No.: 13/525,090

(22) Filed: Jun. 15, 2012

(65) Prior Publication Data

US 2013/0334826 A1    Dec. 19, 2013

(51) Int. Cl.
 *F03G 3/00*    (2006.01)
(52) U.S. Cl.
 USPC .......................................................... 290/1 R
(58) Field of Classification Search
 USPC .......................................................... 290/1 R
 See application file for complete search history.

(56) References Cited

U.S. PATENT DOCUMENTS

| | | | | |
|---|---|---|---|---|
| 1,916,873 A * | 7/1933 | Wiggins | ........................... | 185/39 |
| 4,238,687 A * | 12/1980 | Martinez | ....................... | 290/1 R |
| 6,204,568 B1 * | 3/2001 | Runner | ......................... | 290/1 R |
| 6,353,270 B1 * | 3/2002 | Sen | .................. | 290/1 R |
| 6,767,161 B1 * | 7/2004 | Calvo et al. | ...................... | 404/71 |
| 6,858,952 B2 * | 2/2005 | Gott et al. | ...................... | 290/1 R |
| 7,714,456 B1 * | 5/2010 | Daya | ............................. | 290/1 R |
| 8,123,431 B2 * | 2/2012 | Chen | ............................... | 404/71 |
| 8,164,204 B2 * | 4/2012 | Jang | ............................... | 290/1 R |

* cited by examiner

*Primary Examiner* — Tho D Ta
(74) *Attorney, Agent, or Firm* — Ferraiuoli LLC; Eugenio J. Torres; Rafael Rodriguez Muriel

(57) ABSTRACT

A method and apparatus for producing useful work by a traffic-way or roadway having a moveable portion that can be readily displaced by the weight passing thereover, and translating the displacement of the moveable portion into a storing energy system; e.g., a torsion spring being compressed having a energy release mechanism that connects to an rotor or a drive shaft.

6 Claims, 19 Drawing Sheets

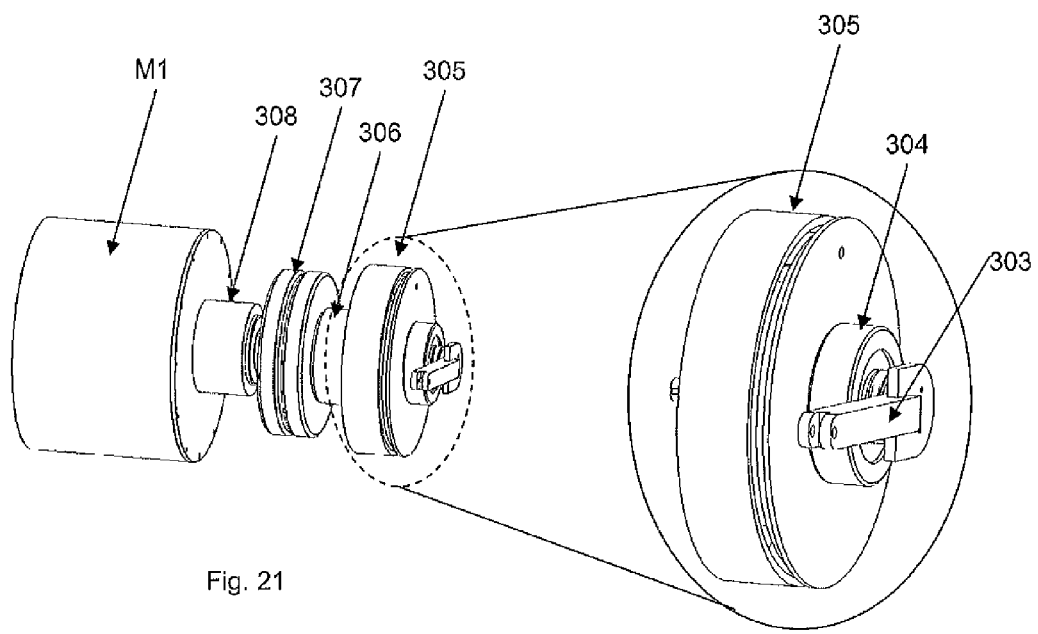
Fig. 21
Fig. 22A
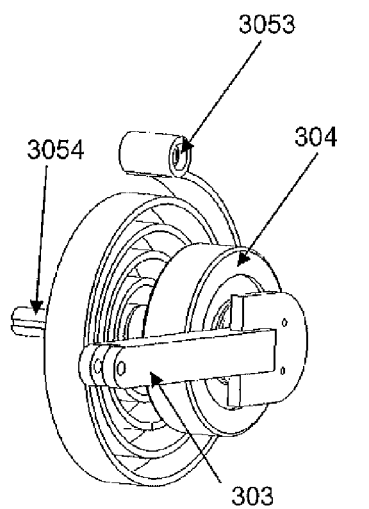
Fig. 22B
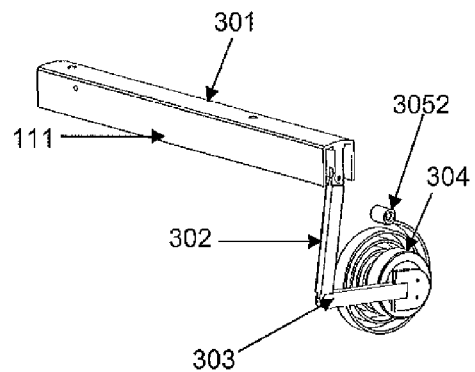
Fig. 22C

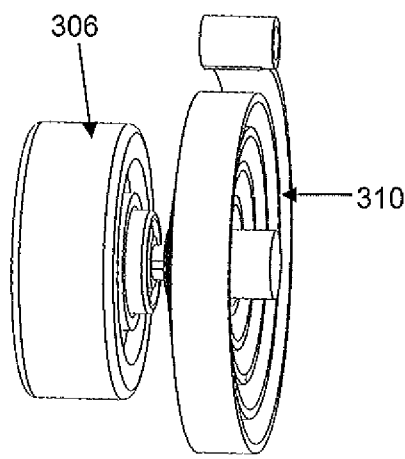
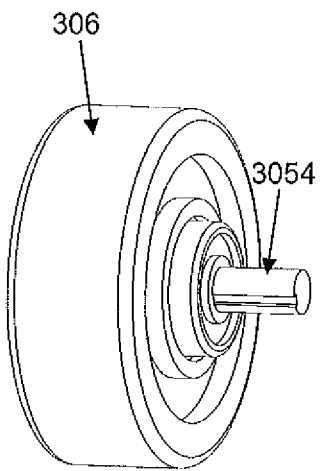
Fig. 24A
Fig. 24B
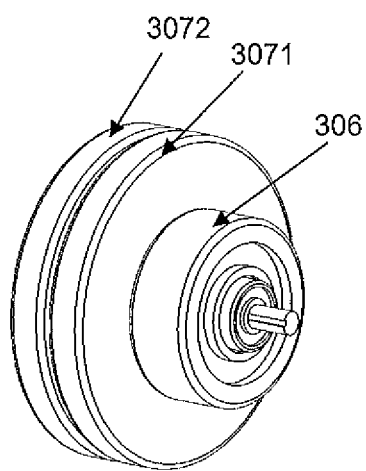
Fig. 24C

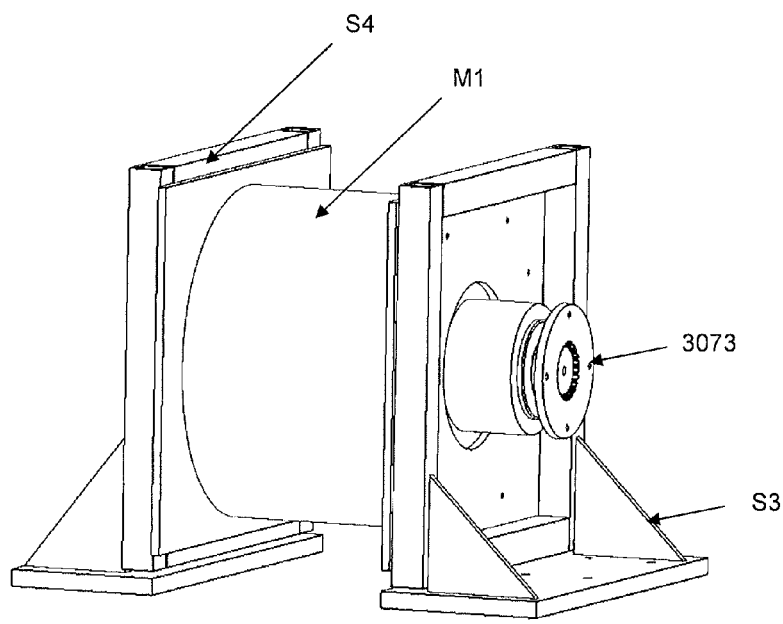
Fig. 27
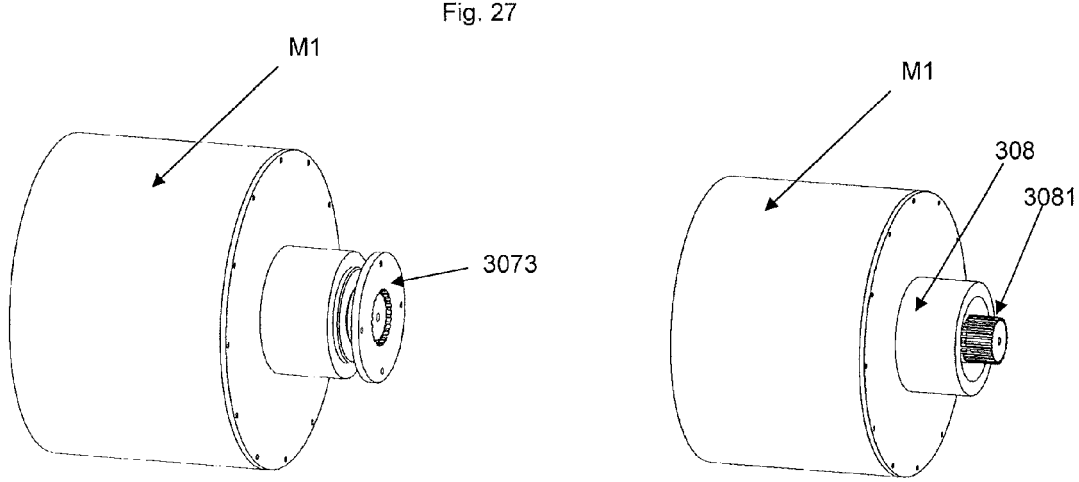
Fig. 28A
Fig. 28B

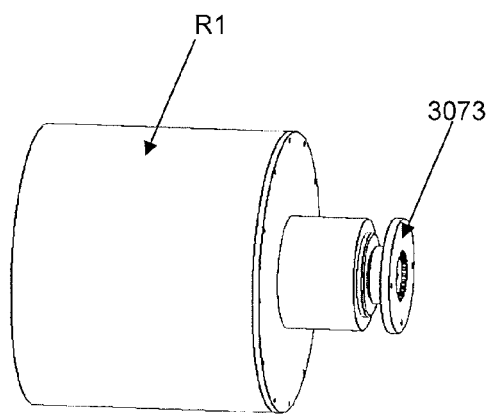
Fig. 30A
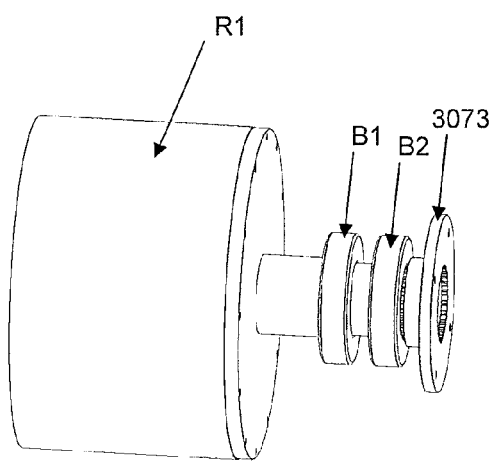 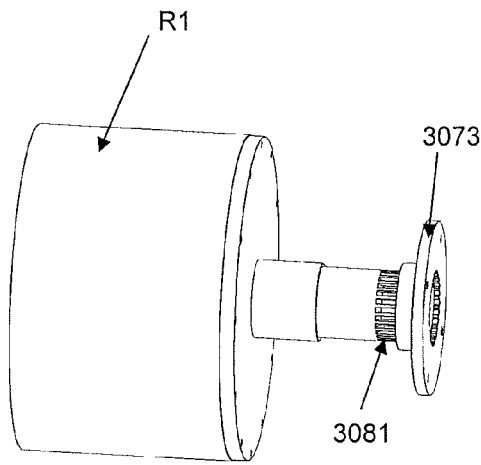
Fig. 30B  Fig. 30C

SYSTEMS FOR GENERATING ELECTRICAL ENERGY

STATEMENT REGARDING FEDERALLY SPONSORED RESEARCH AND DEVELOPMENT

N/A

RELATED APPLICATIONS

N/A

BACKGROUND OF THE INVENTION

1. Field of the Disclosure

The present disclosure relates to a generating system for producing electrical power, and more particularly to an electrical power generating system which utilizes as a source of energy the energy expended by motor vehicles or pedestrians moving along a roadway and further stores the potential energy.

2. Discussion of the Background

Methods and apparatuses have been proposed producing useful work for generating electrical current. Generally, conventional forms of energy; e.g., wind, water, solar, nuclear, or steam power produced by burning conventional fuels such as coal, oil and gas have been used to turn the generators for producing electrical power or other work producing machines.

Further a great deal of energy is expended by and thus available from traffic, such as traffic from pedestrians or rolling vehicles. Generally, this energy is not recouped and put to useful purposes because to date, there are no viable devices for efficiently capturing the energy produce by pedestrian. Pedestrian traffic on city streets or in the entrances and exits of buildings is considerable, and in view of the growing need of energy, tapping that energy so as to recoup some portion of it is one way to save or redirect available energy.

Therefore there is a need to provide generating system that efficiently utilizes as a source of energy the energy expended by and thus available from traffic, such as traffic from pedestrians or rolling vehicles.

SUMMARY OF THE DISCLOSURE

The present disclosure provides a system for storing and utilizing the energy expended by motor vehicles or pedestrians moving along a roadway. Accordingly, it is an object of the present disclosure to provide a system for generating electricity from vehicles in motion, the electrical generation system comprising an actuator assembly comprising a projection above a road surface, a first mechanical element, wherein said first mechanical element is mechanically coupled to the actuator, an energy storage mean, wherein said energy storage mean comprises an energy input terminal and an energy output terminal, an energy releasing mechanism, wherein said energy releasing mechanism is mechanically coupled to said energy output terminal; and a rotor of a generator, wherein said rotor is mechanically coupled to the energy output terminal.

Another object of the present disclosure, in accordance with the principle of the present invention, is to provide a method and apparatus for producing electrical energy which is not dependent on the need of fuel such as coal, oil or gas.

It is another object of the present disclosure, in accordance with the principle of the present invention, to provide a method and apparatus for employing the energy generated by moving traffic to generate useable electrical energy or useful work.

It is therefore an object of the present disclosure, in accordance with the principle of the present invention, to provide method and apparatus to stored potential energy produced by vehicle or pedestrian traffic, to generate useable electrical energy or useful work.

Yet another object of the present disclosure, in accordance with the principle of the present invention, is to provide a storage energy system with a release energy valve or system to generate useable electrical energy or useful work.

Still another object of the present disclosure is to provide a sealing mechanism to the apparatus for producing electrical energy.

The disclosure itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specifications and illustrate the preferred embodiment of the disclosure.

FIG. 21 shows a single generator of said second exemplary embodiment of the energy conversion system without supports in accordance with the principles of the present disclosure.

FIG. 22A through FIG. 22C show sectionals of the actuator system in accordance with the principles of the present disclosure.

FIG. 24A through FIG. 24C shows the energy storage unit coupled to a torque release unit in accordance with the principles of the present disclosure.

FIG. 27 shows a generator assembling with supports in accordance with the principles of the present disclosure.

FIG. 28A through FIG. 28B shows the generator assembling in accordance with the principles of the present disclosure.

FIG. 30A through FIG. 30C shows the rotor assembling in accordance with the principles of the present disclosure.

DESCRIPTION OF THE PREFERRED EMBODIMENT

FIG. 1 through FIG. 6, as disclosed in patent application Ser. No. 12/229,635, included here by reference, shows a general structure of invention arrangement in accordance with the principles of the present disclosure.

The energy conversion system, in accordance with the principles of the present disclosure, comprises a plurality of conversion unities placed under a horizontal rectangular movable bar 12a, wherein movable bar serves as the actuator of the energy conversion system.

Figure 1:
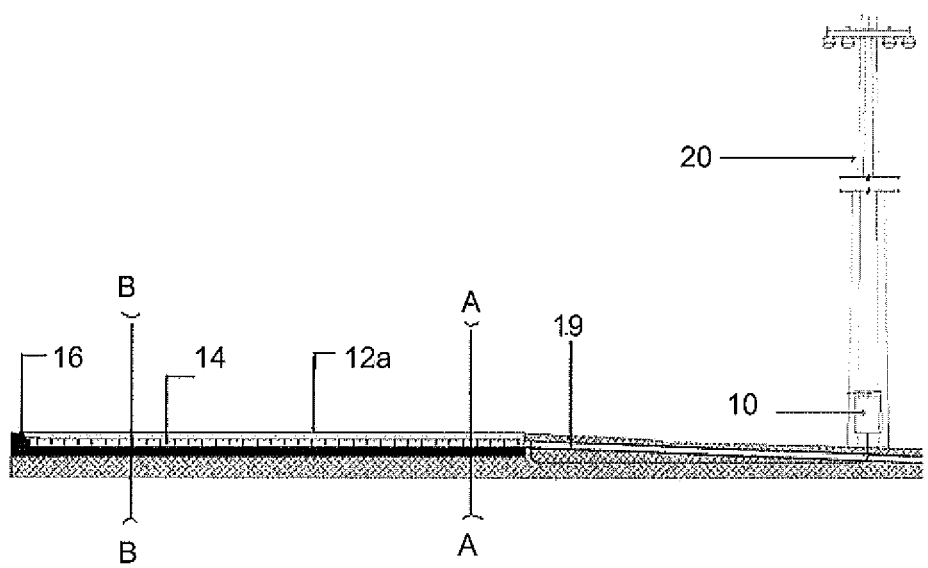
FIG. 1 shows a road section with the general structure of the present disclosure in accordance with the principles of the present disclosure.
Figure 2:
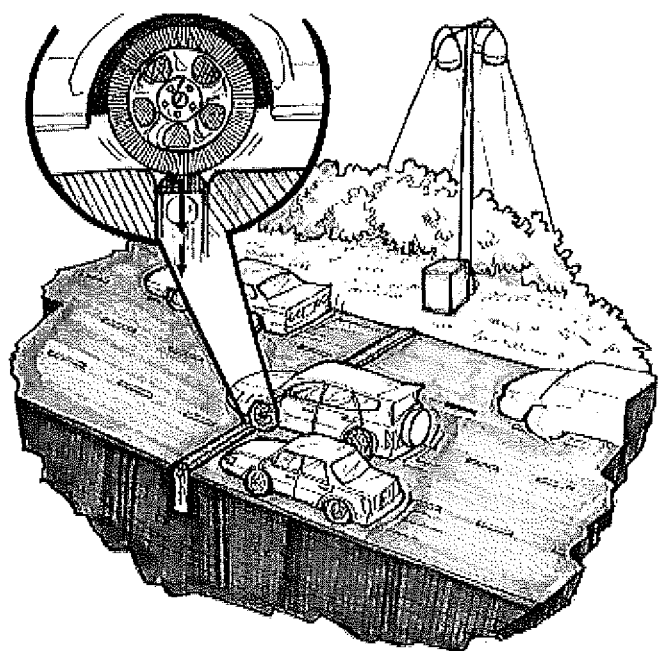
FIG. 2 shows one car crossing over the point of the road where the energy conversion system, in accordance with the principles of the present disclosure, is installed.
Figure 3:
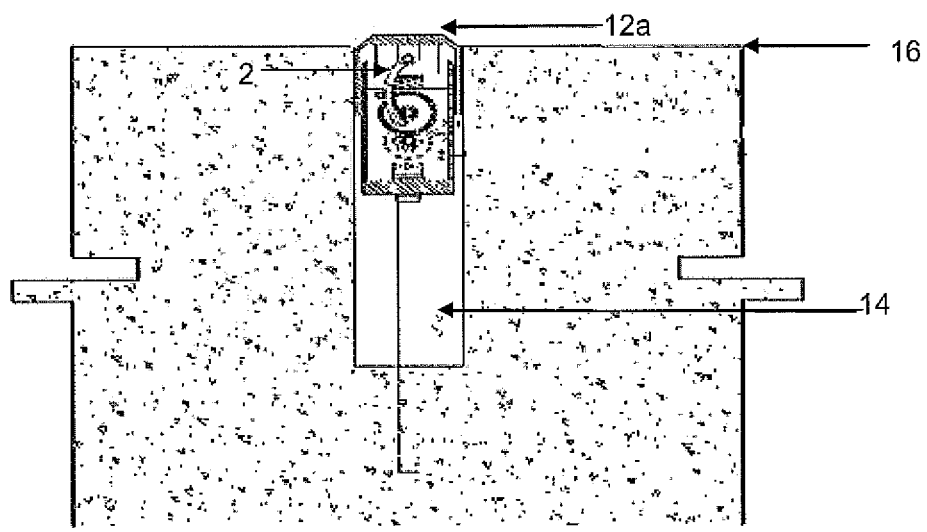
FIG. 3 shows a cross section according to vertical line A-A of FIG. 1, presenting the arrangement of the components of the coordinated plurality of conversion unities of the first exemplary embodiment of energy conversion system in accordance with the principles of the present disclosure.
Figure 4:
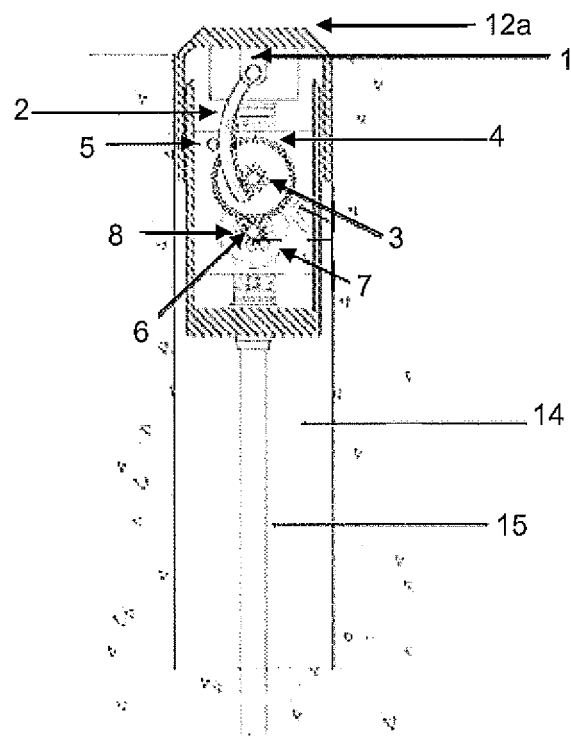
FIG. 4 shows a more detailed view of FIG. 3 of the components of the coordinated plurality of conversion unities of the first exemplary embodiment of the energy conversion system in combination electric generator in accordance with the principles of the present disclosure.

When the vehicles cross over the road pavement, as show in FIG. 2, their wheels exert pressure on the bar 12a. The vertical movement of one shaft 1 fixed to the bar 12a applies a certain pressure upon a conversion unity, in particular upon the upper part of a curved rack 2. This curved rack 2 has a toothed side and a flat opposite side. The toothed side interlocks upon a first pinion 3, which is then forced to rotate, and which is mounted on the same rotation axis than a gear wheel 4 of a larger diameter than that of the first pinion 3. The flat side 2b of this curved rack 2 slides over a fixed roller 5. The wheel 4, that it is toothed, rotates due to the movement transmitted by the first pinion 3, due to the initial pressure applied by said curved rack 2 due to a vehicle passing. The gear wheel 4 interlocks upon a second pinion 6. This geared engagement 2-3-4-6 causes this second pinion 6 to rotate in a direction opposite to the first pinion 3. Then, a dynamo 7 mounted on the same rotation axis than the second pinion 6 is forced to rotate at great speed, thus generating electricity. The second pinion 6 is joined to a ratchet mechanism 8, not shown in detail in FIG. 4, said mechanism being concentric with the pinion 6, which is then allowed to rotate in only one direction.

The conversion unities generating electric energy are located at equal intervals all along in the channel/drainage chamber 14. This electric energy is transmitted through copper cables to a bank of batteries 10, where it is stored. This current from the bank of batteries 10 can be employed in different ways, e.g., for led illumination of road lamppost.

Figure 5:
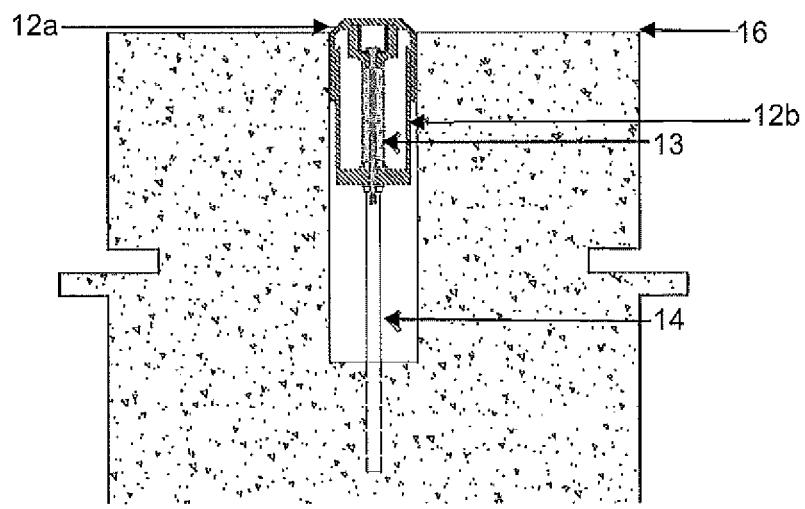
FIG. 5 shows a cross section according to vertical line B-B of FIG. 1, showing a first exemplary embodiment of the water-tight anchorage and drainage arrangement of the energy conversion system in accordance with the principles of the present disclosure.
Figure 6:
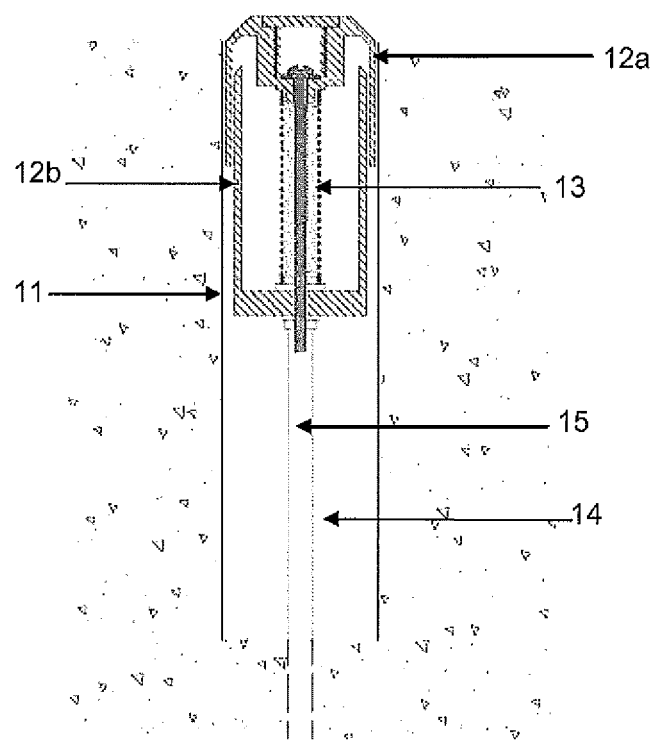
FIG. 6 shows a more detailed view of FIG. 5 showing the components of the system for the first exemplary embodiment of the water drainage in accordance with the principles of the present disclosure.

Further a water-tightness system or water-tight anchorage and drainage arrangement 11 is provided as a protection of the conversion system inside the chamber from the environment. The water-tightness system comprises, as shown in FIG. 5, two rectangular bars, an upper movable one 12a as a cover, and a lower fixed one 12b fitting in slidable manner into the upper one, the elements of the coordinated plurality of conversion unities being located at certain intervals in a free space inside the said bars 12a and 12b; a spring 13 that it is adjusted to the up and down movement of the bar 12a depending on the crossing of the vehicles; a drainage chamber 14, where the water falling on the pavement 16 is accumulated; fastening bolts 15 to fasten the system to the ground; and a drainage pipe 19. Said elements 13 and 15, are each located at certain intervals along the water-tight anchorage and drainage arrangement, thus assuring an effective fixation of the complete conversion system, and the effective operation of the energy conversion system.

Figure 7:
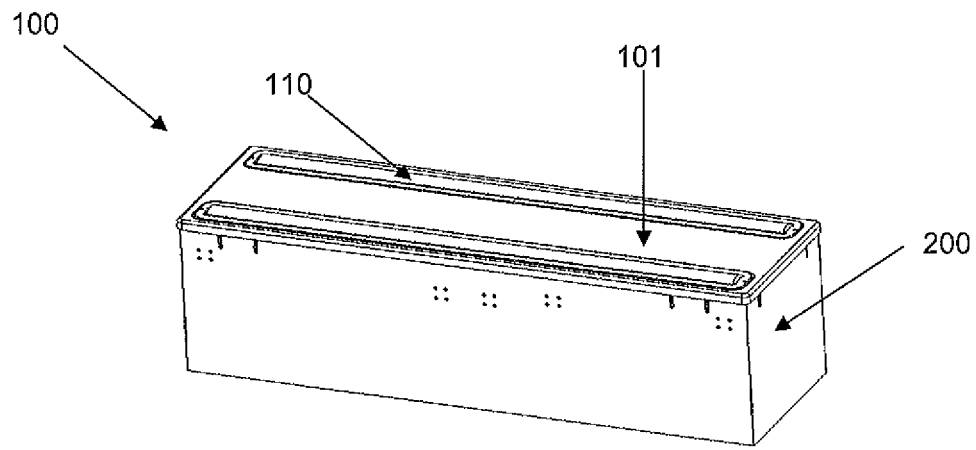
FIG. 7 shows a second exemplary embodiment of the energy conversion system housing in accordance with the principles of the present disclosure.

FIG. 7 is directed to the second exemplary embodiment of system housing, in accordance with the principles of the present disclosure, which comprises an energy storage mean. The housing 100 protect and comprises an outer wall surrounding the energy conversion elements 300 and a top housing cover 101 having resilient sections 110 cover by sealing means or water-tight anchorage to avoid water damages to the energy conversion elements 300. In the instant case the housing comprises a rectangular shape; however the shape or configuration may change depending on the road, pedestrian side walk and/or the energy conversion elements 300. The housing 100 is configured to be located in a hole made at the road or path wherein pedestrian or vehicle transits.

Figure 8:
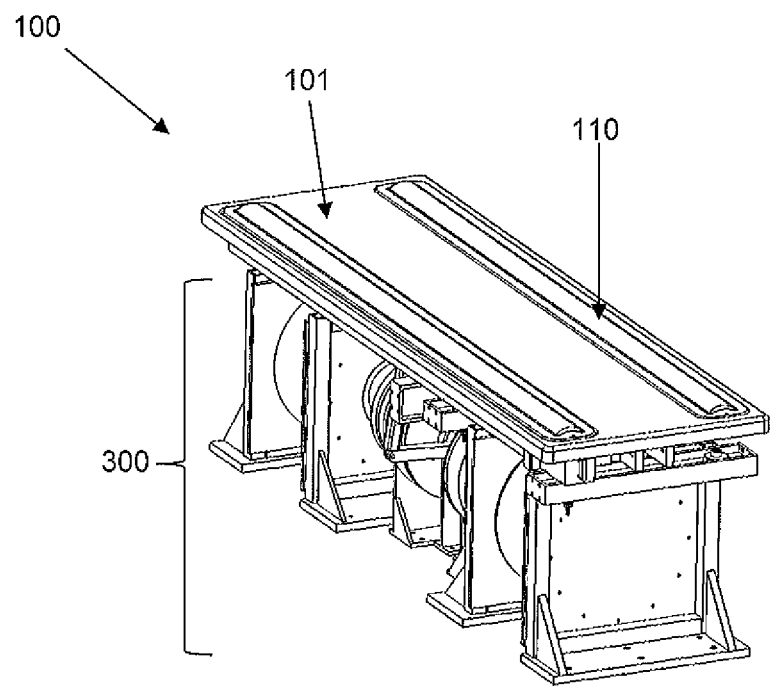
FIG. 8 shows a second exemplary embodiment of the energy conversion system inner elements connected to the housing top cover in accordance with the principles of the present disclosure.
Figure 9:
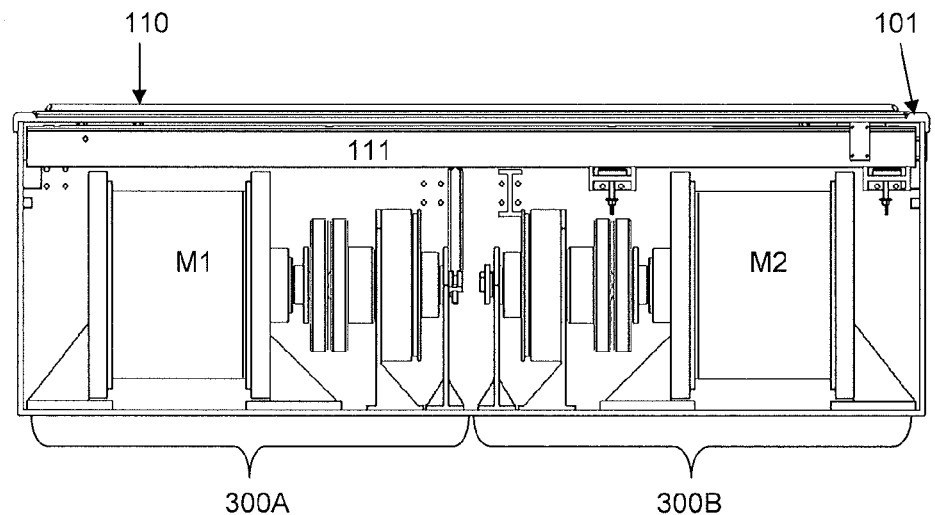
FIG. 9 shows a side view of the second exemplary embodiment of the energy conversion system connected to the housing top cover in accordance with the principles of the present disclosure.

FIG. 8 is directed to the connection of the housing top cover 101 with the energy conversion elements 300 of the energy complete conversion system. Each housing 100, as mentioned, encloses at least a conversion system capable of store energy and produce electrical energy. A single housing may enclose more than one unit of energy conversion 300A, 300B. FIG. 9 shows at least two energy conversion units 300A, 300B enclosed in the same housing 100. Each unit energy conversion 300A, 300B may be connected by a single actuator system or in the same housing by independent actuator systems. Similar to the first exemplary embodiment, the energy conversion system 100 comprises actuator system including a bar 111 that transmit a vertical movement to the energy conversion elements 300.

Figure 10:
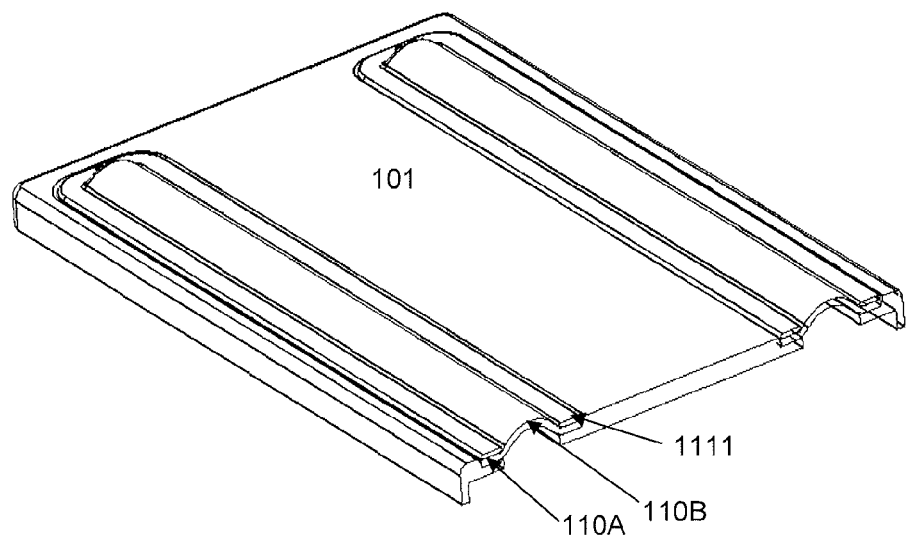
FIG. 10 shows a second exemplary embodiment sectional view of the housing top cover in accordance with the principles of the present disclosure.

The housing top cover 101, as previously mentioned, comprises a resilient section 110 made of resilient material such as rubber, as shown in FIG. 10. The resilient section 110 comprises a concave configuration 110B and extensions 110A. The concave configuration 110E protrudes from the road when installed.

Figure 11:
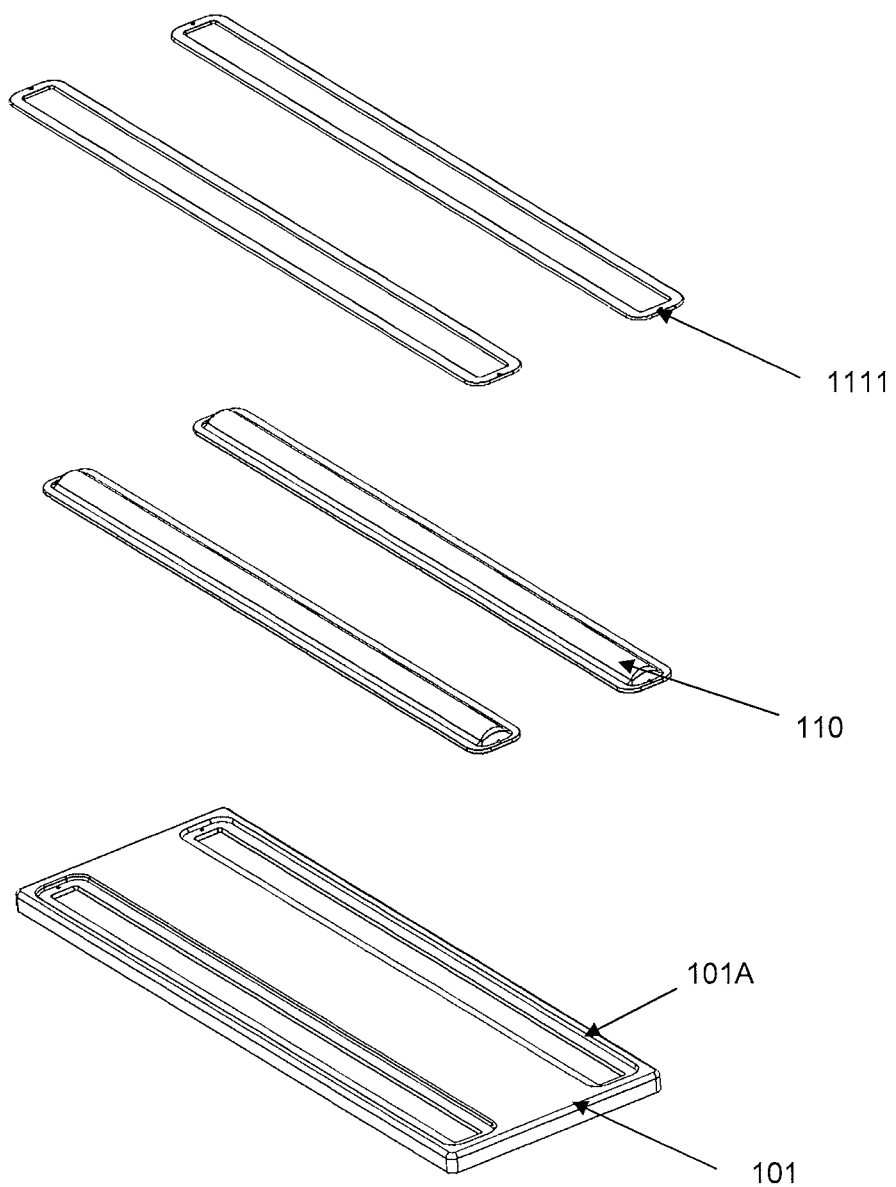
FIG. 11 shows a second exemplary embodiment assembly of the housing top cover in accordance with the principles of the present disclosure.

A sealer of water-tight anchor 1111 is positioned over the extensions 110A avoiding liquid filtration to the energy conversion unit. FIG. 11 is directed to the housing top cover 101 assembly. As shown, the housing top cover 101 comprises at least a recess 101A configured to fit the resilient section 110. The recess 101A is cover with the resilient section 110 and sealed by means of the water-tight anchor 1111 as explained before.

Figure 12:
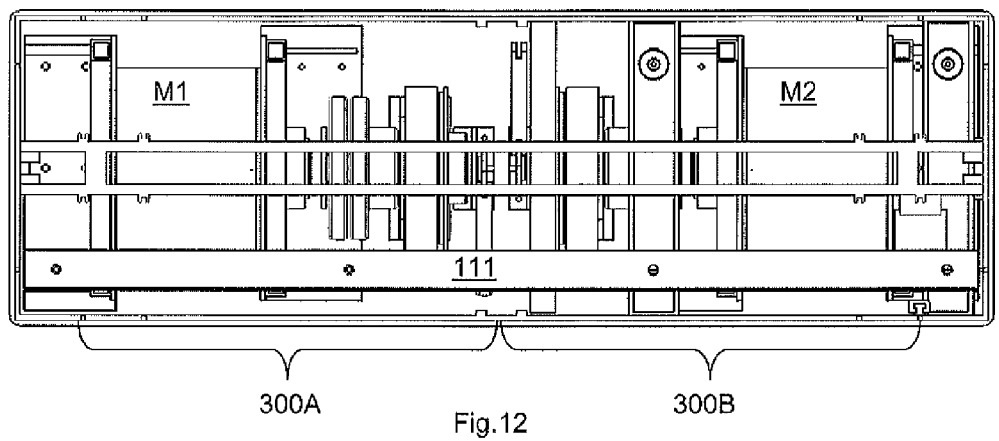
FIG. 12 shows a top view of the second exemplary embodiment of the energy conversion system without housing top cover in accordance with the principles of the present disclosure.

FIG. 12 is directed to the lower part of the housing 200, more particularly the actuator bar 111 and the units' energy conversion 300A, 300B. The actuator bar 11 essentially extends across the housing. It is meant to be essentially extended across the housing because the bar 111 is configured to be aligned to the recess 101A.

Figure 13:
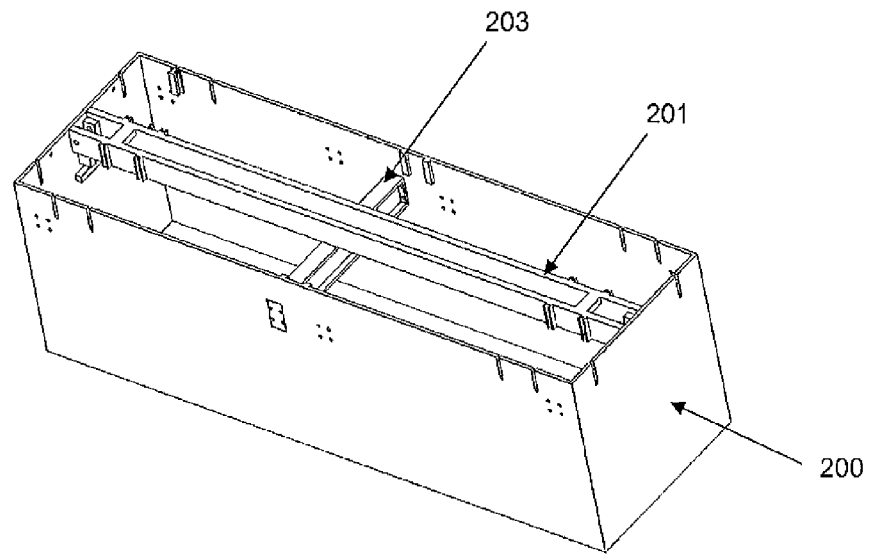
FIG. 13 shows an isometric view of the housing of the second exemplary embodiment of the energy conversion system without housing top cover in accordance with the principles of the present disclosure.
Figure 14:
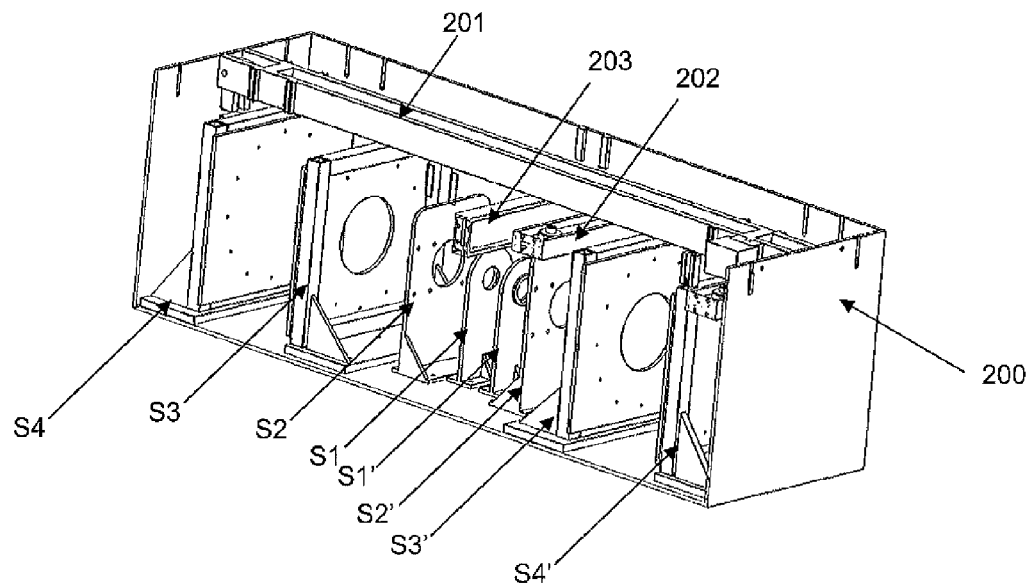
FIG. 14 shows an isometric view of the supports inside the housing of the second exemplary embodiment of the energy conversion system without housing top cover in accordance with the principles of the present disclosure.
Figure 15:
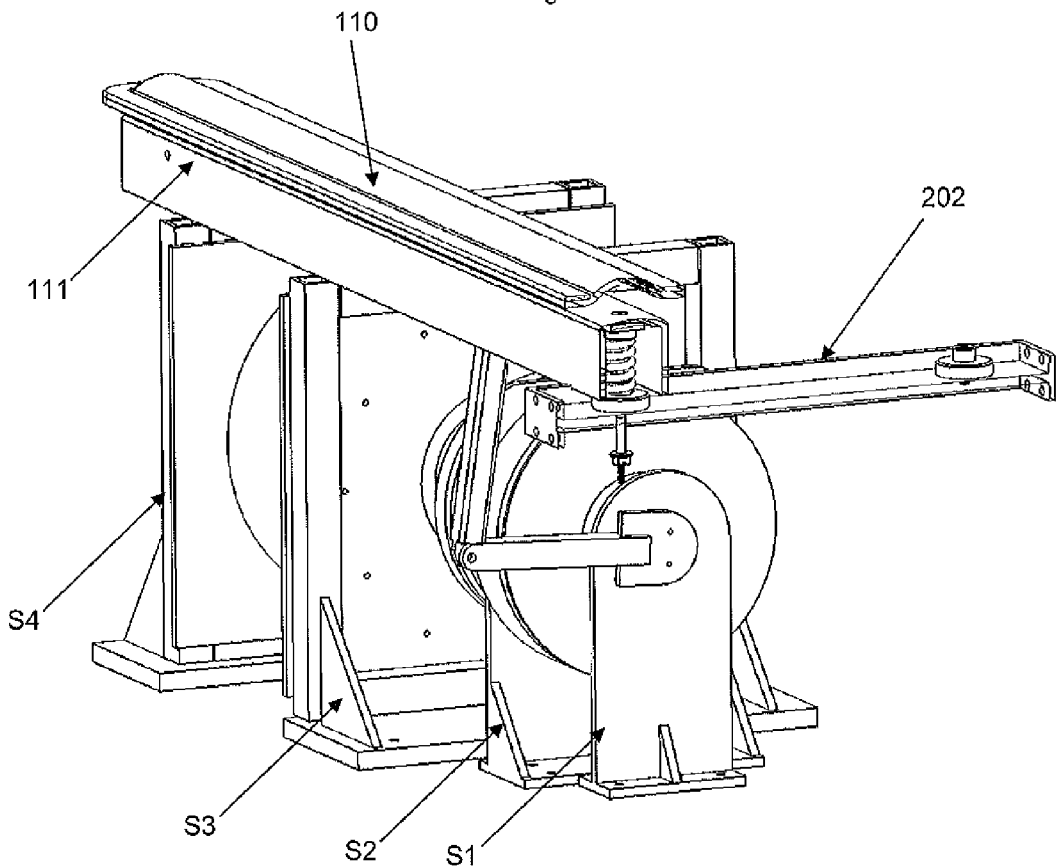
FIG. 15 shows a sectional view of the actuator connected to the electrical energy generation system of the second exemplary embodiment of the energy conversion system in accordance with the principles of the present disclosure.

FIG. 13 discloses the lower part of the housing, as mentioned before, comprising an external wall 200 configured to enclose the energy conversion elements 300. The inner frame extensions 201,203 are provided to avoid deformation of the walls or the wall collapsing. Further the inner frame extension 201,203 served to hold some elements of the energy conversion system. Several supports S1,S2,S3,S4, as shown in FIG. 14. FIG. 15, are extended vertically to the housing bottom surface and are configured to support several energy conversion elements 300. FIG. 15 clearly show the alignment of the actuator assembly, the resilient section 110 and the actuator bar 111. It has to be understood any force applied on the resilient section 110 is transmitted to the actuator bar 111.

Figure 16:
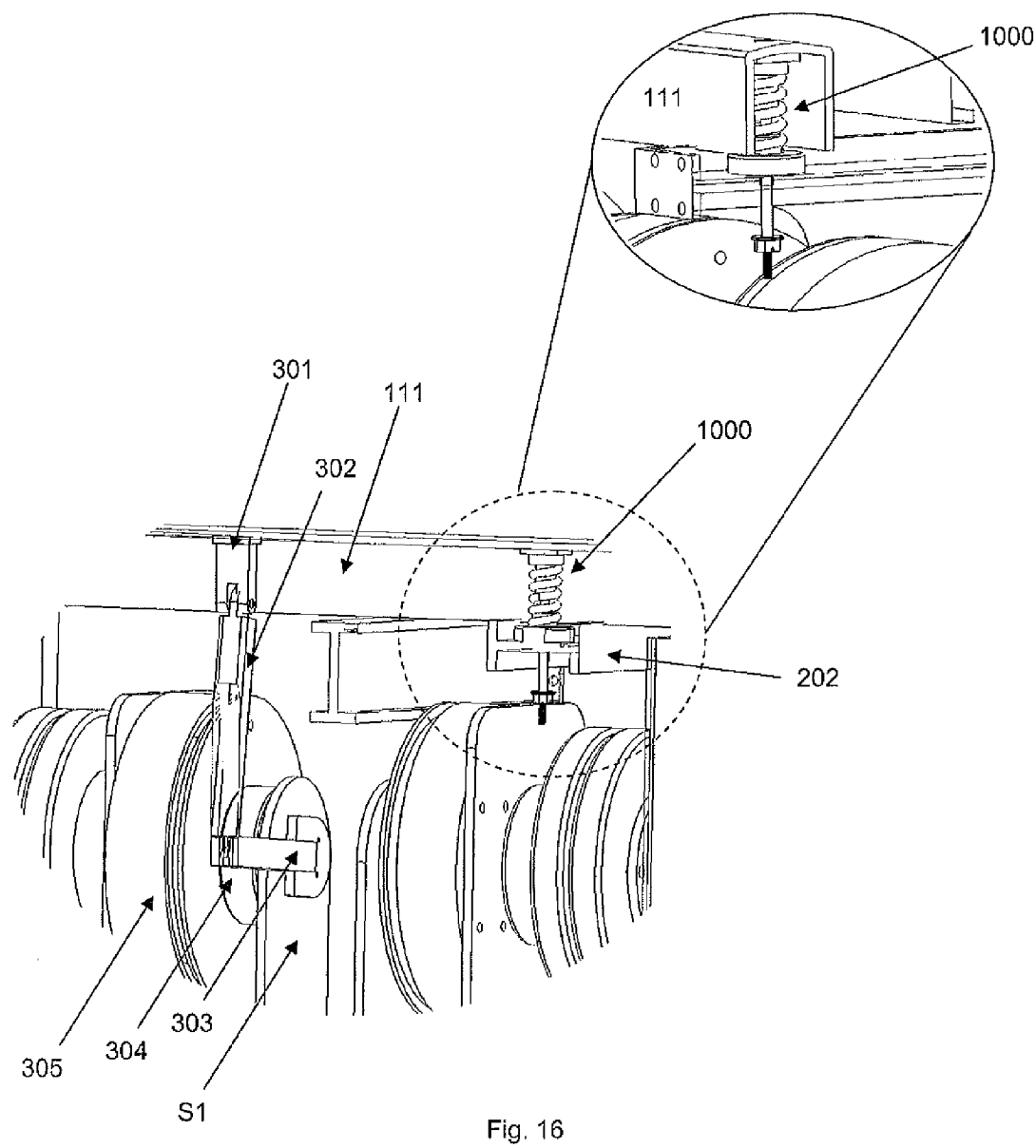
FIG. 16 shows a sectional view and exploded view of the resilient assembly connected to the electrical energy generation system of the second exemplary embodiment of the energy conversion system in accordance with the principles of the present disclosure.
Figure 17:
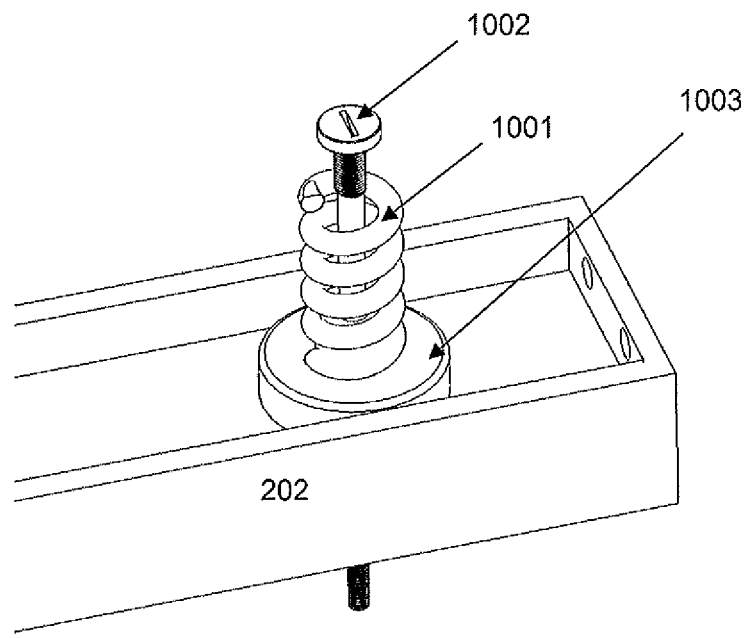
FIG. 17 shows a detailed exploded view of the resilient assembly connected to the housing of the electrical energy generation system of the second exemplary embodiment of the energy conversion system in accordance with the principles of the present disclosure.
Figure 18:
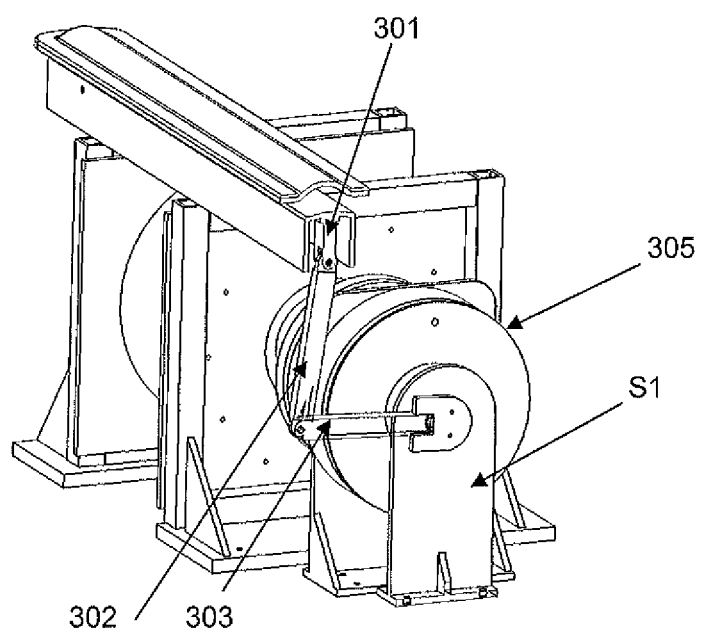
FIG. 18 shows a sectional view of the actuator assembly connected to the electrical energy generation system of the second exemplary embodiment of the energy conversion system in accordance with the principles of the present disclosure.
Figure 19:
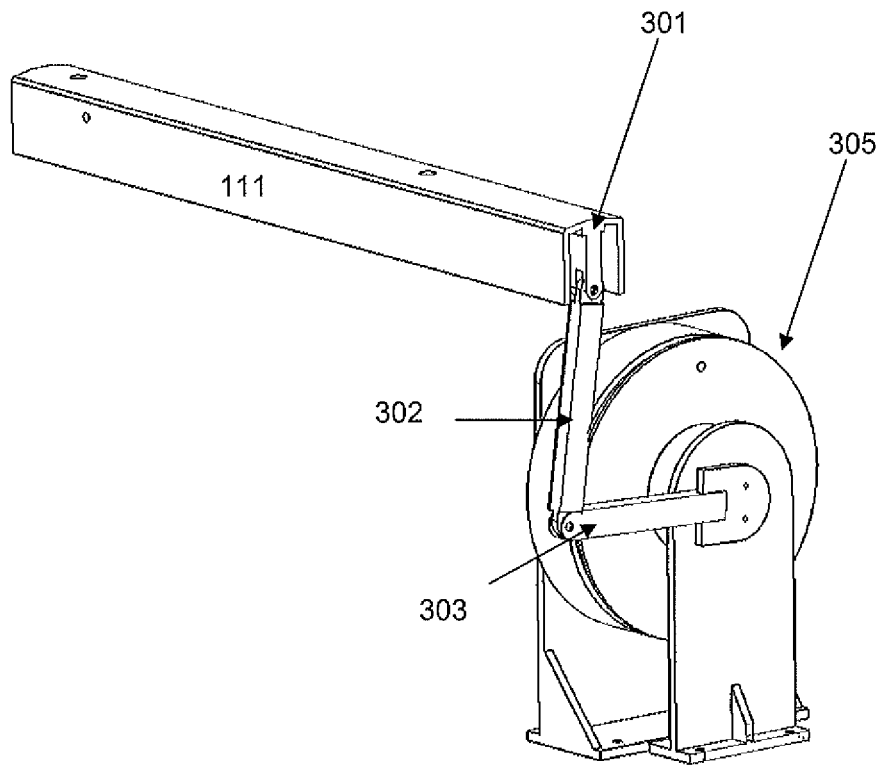
FIG. 19 shows a sectional view of the actuator assembly connected to the electrical energy generation system of the second exemplary embodiment of the energy conversion system in accordance with the principles of the present disclosure.

The actuator bar 111 is coupled to a vertical arm 302 by means of a bar attachment part 301, as shown in FIG. 16. Further the actuator bar 111 comprises a resilient member 1000 connected to inner frame 202. The resilient member 1000 as shown in FIG. 17 through FIG. 19 comprises an extended member 1002 mechanically coupled to the actuator bar 111. The extended member 1002 pass through the inner frame 202 in such way that the inner frame only permits the vertical movement of the extended member 1002. A spring 1001 and a buffer 1003 are fixed to the housing by means of support 202. The resilient member 1000 provides a reciprocal motion of the bar 111, therefore after a vehicle or pedestrian interaction the actuator bar 111 returns to its original position.

Figure 20:
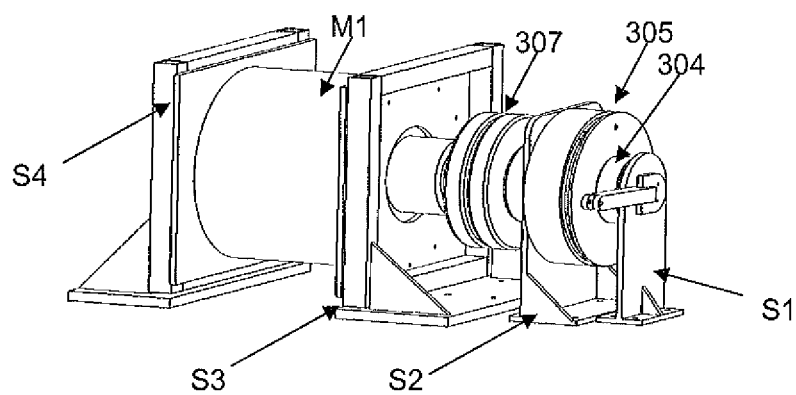
FIG. 20 shows a single generator of said second exemplary embodiment of the energy conversion system in accordance with the principles of the present disclosure.
Figure 23A:
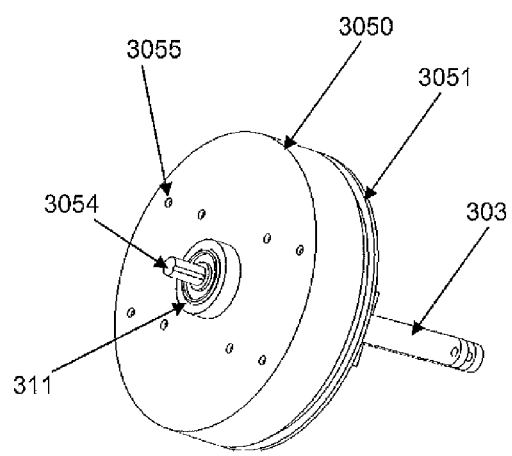
FIG. 23A through FIG. 23D shows the energy storage unit in accordance with the principles of the present disclosure.
Figure 23B:
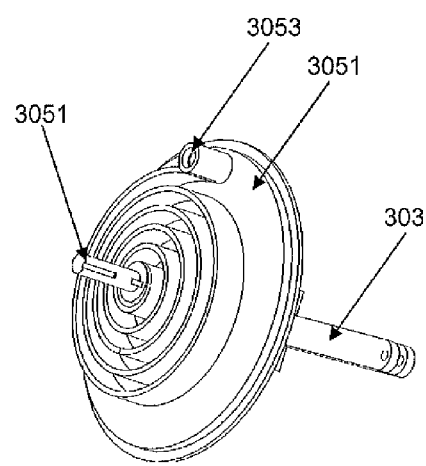
Figure 23C:
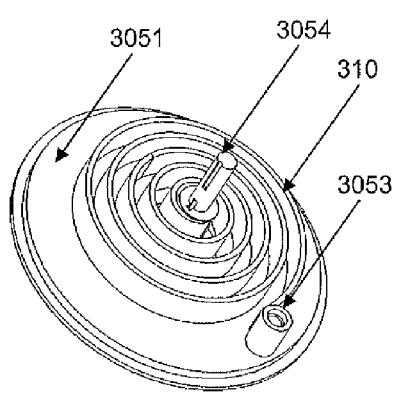
Figure 23D:
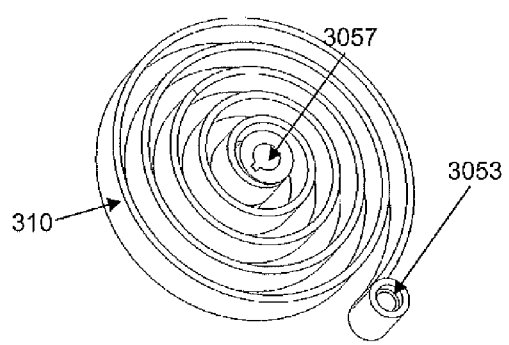

A single unit for energy conversion, as show in FIG. 20, comprises first actuator or movable bar 303, said first actuator 303 is mechanically coupled to an uni-directional mechanism 304 that tolerate rotation of a first drive in one direction, such as a unidirectional clutch, an energy storage mean 305, wherein said energy storage mean comprises an energy input terminal IT and an energy output terminal OT, wherein said uni-directional clutch 304 is mechanically coupled to said energy input terminal IT and the energy output terminal OT is coupled to a torque release unit 306 connected to a flywheel 307 and the generator unit M1, wherein said generator unit comprises a rotor R1 and stator ST1, wherein said rotor R1 is mechanically coupled to the energy output terminal OT.

FIG. 21 is directed to the mechanical connection between conversion elements without housing supports. Further, FIG. 22A through 22C provides more details of the first actuator 303 and storage unit 305. The first actuator 303 is coupled to the uni-directional clutch 304 which in turn is coupled to the storage unit 305. The storage unit 305 comprises a spring torque 310 accumulates energy by torsion or twisting. The spring 310 is twisted by means of the first actuator 303 until reaching a designated torque value. Basically the force applied by the pedestrian to the actuator bar 111 is transmitted to the first actuator 303 which twist or compress the spring 310.

FIG. 23A through 23D are directed to the energy storage unit 305, more particularly the spring torque 310. The storage unit comprises a spring torque cover 3050 comprising several recesses 3055 and a bottom platform 3051. The actuator shaft 3054 is coupled to the inner end 3057 of the spring torque 310 and the outer end 3053 of the spring torque 310 is coupled to the platform 3051. Since the actuator shaft 3054 rotates the inner end 3057 while the outer end is fixed to the platform 3051, as result of the first actuator 303 and one-way clutch, the spring 310 starts to twist and compress. Once the set-up torque value is reached the torque release unit 306 discharges the accumulated potential energy.

FIG. 24A through 24B are directed to the mechanical connection between torque release unit 306, storage unit 305 and flywheels 3071, 3072. The torque release unit 306, as mentioned, is set to a predetermined value. This pre-determined value is proportional to an internal air pressure which locks the torque release unit. As long as the pre-determined value of the torque is not reached the actuator shaft 3054 will not be allowed to move. This allows the input torque to keep accumulating in the torsional spring 310. When the pre-determined value of the torque is reached, the torque release unit unlocks and allows the actuator shaft 3054 to move freely allowing the accumulated torque from the torsional spring 310 to be transferred to the flywheel unit 307 and thus the generating unit M1.

Figure 25A:
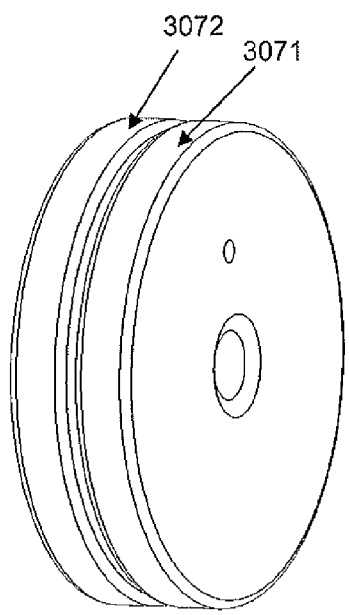
FIG. 25A through FIG. 25B shows the flywheel coupled to energy conversion system in accordance with the principles of the present disclosure.
Figure 25B:
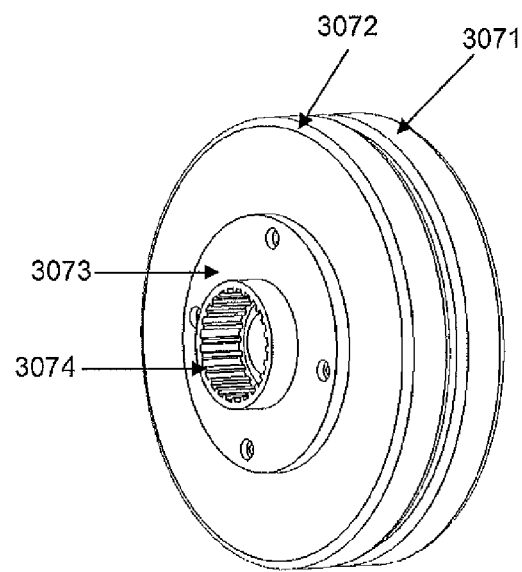

The energy released, in form of rotational energy, is transferred to a set of flywheels 3071, 3072, as shown in FIG. 25A through 25B. The flywheels 3071, 3072 comprises at least a flywheel 3071, 3072 and an engaging plate 3073 with an engaging end 3074. Further the flywheel unit 307 works as units to storage, wherein said flywheels are rotating mechanical devices that are used to store rotational energy. Flywheels have a significant moment of inertia, and thus resist changes in rotational speed.

Figure 26:
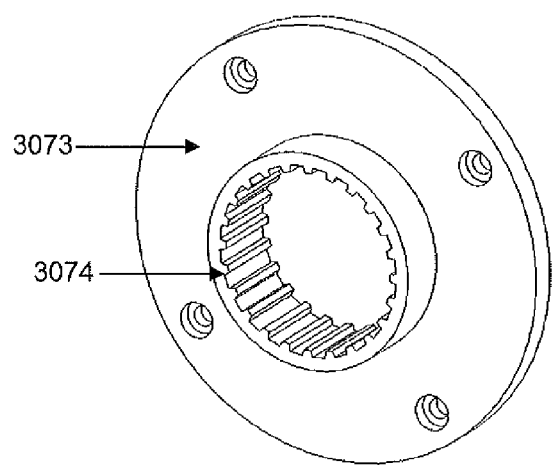
FIG. 26 shows a shaft engaging plate of the energy conversion system in accordance with the principles of the present disclosure.
Figure 29A:
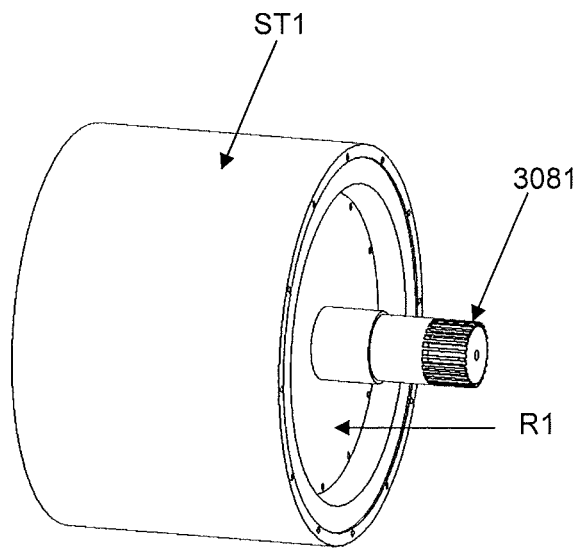
FIG. 29A through FIG. 29B shows the stator assembling in accordance with the principles of the present disclosure.
Figure 29B:
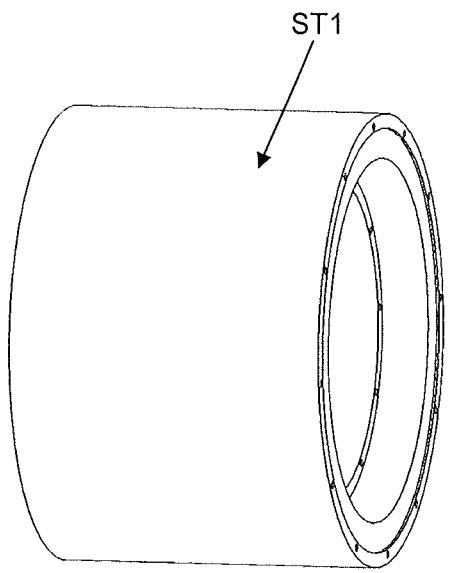

At least one of the flywheels is coupled to a shaft engaging plate 3073, as show in FIG. 26. The shaft engaging plate transmits the rotational energy from the flywheel to the generator unit.

FIG. 27 through FIG. 30C is directed to the generator assembling. The engaging plate 3073 is coupled to the rotor shaft 3081. In the instant case a generator M1 comprising a inner rotor is provided, however it can be connected to a outer rotor. FIG. 28A through FIG. 28B clearly shows the engaging plate 3073 coupled to the rotor shaft 3081. The stator ST1 surrounds the rotor R1, as shown in FIG. 29A through FIG. 29B. The rotor R1, as shows in FIG. 30A through FIG. 30C is supported by a set of bearing B1,B2 in order to support while providing a smooth rotation of the rotor R1.

Although the disclosure has been shown and described with respect to an illustrated embodiment, equivalent alterations and modifications will occur to those skilled in the art upon reading and understanding the specification and the preferred embodiment within the scope of the appended claims.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A system for generating electricity from vehicle motion, the system comprising:
   a housing comprising a housing top cover,
   wherein said housing top cover comprises a resilient section projecting above a road surface,
   an actuator bar mechanically coupled to said resilient section,
   a first actuator, wherein said first actuator is mechanically coupled to the actuator bar, wherein the resilient section displacement is transmitted to the first actuator by means of the actuator bar,
   an energy storage means comprising a torsion spring, wherein said energy storage means comprises an energy input terminal and an energy output terminal, wherein said first actuator is mechanically coupled to said energy input terminal;
   a torque release unit, wherein said torque release unit is mechanically coupled to said energy output terminal, wherein said torque release unit is configured to limit movement of the torsion spring for storing potential energy; and
   a rotor of a generator, wherein said rotor is mechanically coupled to the energy output terminal for transmitting said potential energy to said rotor.

2. The system for generating electricity from vehicle motion, as in claim 1; wherein an one way clutch in mechanically coupled between said first actuator and said energy input terminal.

3. The system for generating electricity from vehicle motion, as in claim 1; wherein one way clutch is mechanically coupled between said energy output and said rotor.

4. A system for generating electricity comprising;
   a first actuator;
   an energy storage means, wherein said energy storage means comprises an energy input terminal and an energy output terminal, wherein said first actuator is mechanically coupled to said energy input terminal;
   an energy release unit, wherein said energy release unit is mechanically coupled to said energy output terminal, wherein said energy release unit is configured to limit the movement of the energy storage mean for storing potential energy; and
   a rotor of a generator, wherein said rotor is mechanically coupled to the energy output terminal for transmitting said potential energy to said rotor.

5. The system for generating electricity, as in claim 4; wherein said energy storage means comprises a torsion spring.

6. A system for generating electricity, as in claim 4; wherein said energy release unit is a torque release unit, wherein said torque release unit measures the energy stored in the energy storage means and compares a measured energy stored value with an energy selected value.

* * * * *